L. H. BUCHANAN.
MOTOR VEHICLE POWER PLANT ELEVATING APPLIANCE.
APPLICATION FILED SEPT. 17, 1920.
1,382,714.
Patented June 28, 1921.
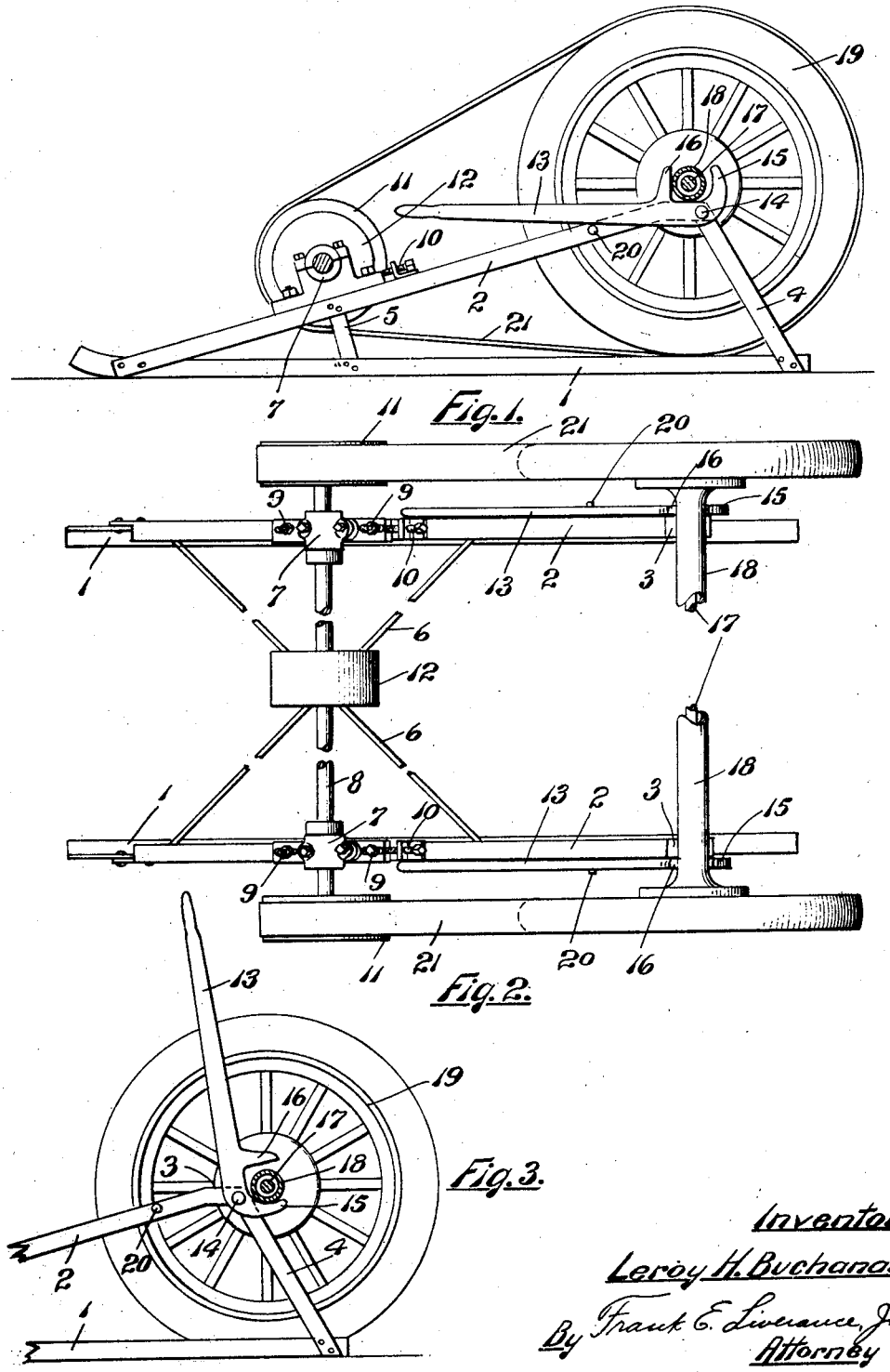

UNITED STATES PATENT OFFICE.

LEROY H. BUCHANAN, OF WISCONSIN SOLDIERS HOME, WISCONSIN.

MOTOR-VEHICLE-POWER-PLANT ELEVATING APPLIANCE.

1,382,714.  Specification of Letters Patent.  Patented June 28, 1921.

Application filed September 17, 1920. Serial No. 410,940.

*To all whom it may concern:*

Be it known that I, LEROY H. BUCHANAN, a citizen of the United States of America, residing at Wisconsin Soldiers Home, in the county of Waupaca and State of Wisconsin, have invented certain new and useful Improvements in Motor-Vehicle-Power-Plant Elevating Appliances; and I do hereby declare the following to be a full, clear, and exact description of the invention, such as will enable others skilled in the art to which it appertains to make and use the same.

This invention relates to a power plant for use in connection with motor vehicles and for transmitting power therethrough from the vehicle to any machine capable of being driven from the plant. It is a primary object and purpose of the invention to construct a power plant of this character and equip it with means whereby the rear axle of the vehicle may be quickly and easily elevated and placed in position on the frame of the power plant and retained in such position during the operation of the plant, the rear wheels of the vehicle also being lifted off the ground and left free for driving purposes. Further objects and purposes of the invention will appear fully and in detail as understanding of the invention is had from the following description, taken in connection with the accompanying drawing, in which, Figure 1 is a partial side elevation and sectional view of the power plant, showing the position of the rear axle and rear wheels of the motor vehicle used for running the plant.

Fig. 2 is a plan view of the plant, and

Fig. 3 is a fragmentary view similar to Fig. 1 showing the position of the axle elevating levers of the plant before the rear axle of the vehicle is elevated to operative position.

Like reference characters refer to like parts in the different figures of the drawing.

In the construction of the power plant two bed members 1, preferably of angle iron are used and adapted to rest on the ground. Other angle iron members 2 are connected thereto near the outer ends of the bed members and incline upwardly and inwardly as shown, at their front ends being bent to substantially horizontal to make seats 3 on which the rear axle housing of the vehicle may rest. The sides of the frame of the power plant are completed by inclined members 4, also of angle iron, preferably and connecting the inner ends of the members 1 and 2, while intermediate reinforcing braces 5 are connected to members 1 and 2 as shown. The two sides of the frame are connected and held in spaced apart relation by cross rods 6 which serve to hold the sides apart and brace the same. This system of bracing the sides of the frame may be varied in many ways without changing the invention in any way.

A journal box 7 is connected to and above each member 2 between the ends thereof and a cross shaft 8 mounted therein. The journal boxes are attached to the members 2 by bolts 9 passing through slots in the journal members thereby permitting a limited adjustment of the journals which may be effected by screws 10 as shown. A pulley 11 is fixed at each end of shaft 8 and a third pulley 12 is secured to the shaft at a point between the ends of the shaft.

A lever 13 is pivotally mounted at 14 on each side of the frame substantially at the junction of the members 2 and 4. This lever is formed with a hook 15 at its inner end, spaced from which a short distance is an upwardly projecting lug 16. In the upturned positions of the levers, as shown in Fig. 3, and with the power plant brought close to the rear axle of a motor vehicle, the rear axle housing 18 in which the rear axle 17 is housed comes between hook 15 and lug 16 on each lever and on turning the levers to horizontal position, as shown in Fig. 1, the hooks 15 engage under the rear axle housing 18 and serve to elevate the same and draw it on to the horizontal seats 3 of the sides of the frame, at the same time lifting the rear wheels 19 of the vehicle which are attached to the ends of the rear axle 17. In practice a stop pin 20 may be placed on each member 2 of the frame and limit the extent of the movement of the levers 13. When thus elevated, wheels 19 are in alinement with pulleys 11, permitting the placing of belts 21 around the wheels 19 and pulleys 11 to drive shaft 8. In turn by means of a belt passing around pulley 12 to any desired machine to be operated, said machine may be driven.

This construction of power plant is simple but very practical in use, as is evident. The ease with which the vehicle is placed in position on the frame of the power plant is one particularly meritorious feature of the invention. Likewise, after the desired work has been done, it is necessary only to remove the belts 21, whereupon the vehicle may be immediately disengaged from the power plant by merely lifting the levers 13. Because of the long lever arm to the lever 13, very little force need be exerted in placing the vehicle in position on the plant. The lugs 16 stop the movement of the vehicle to the rear under the pull of the belts, and the belts may be tightened to proper tension on both sides by operation of the screws 10.

The invention is defined in the appended claims, and I consider myself entitled to all forms of structure falling within the scope of said claims.

I claim:

1. A device of the character described, comprising a supporting frame having spaced apart sides including each a horizontal portion, a lever pivotally mounted on each side of the frame at one end and at the upper portion thereof at the front end of said horizontal portion, and a hook and a lug projecting from the same at one end of each lever and in the same direction, said hook and lug being spaced apart and located at opposite sides of the pivot of the lever, substantially as described.

2. A device of the character described, comprising a supporting frame having spaced sides each including a horizontal portion adapted to go under the rear axle of a motor vehicle, and levers mounted on the sides of the frame for lifting the rear axle of a motor vehicle on to said horizontal portions of the frame, substantially as and for the purposes described.

3. A device of the character described, comprising a supporting frame having spaced apart sides each including a horizontal portion and adapted to go under the rear axle of a motor vehicle, and levers pivotally mounted, one on each side of the frame and equipped with means for engaging with the rear axle housing of a motor vehicle and elevate the same on to the horizontal portions of frame and hold the same against movement therefrom, substantially as described.

In testimony whereof I affix my signature.

LEROY H. BUCHANAN.